United States Patent
Malinovskiy et al.

(10) Patent No.: US 8,276,444 B2
(45) Date of Patent: Oct. 2, 2012

(54) METHOD FOR ASCERTAINING AND MONITORING FILL LEVEL OF A MEDIUM IN A CONTAINER USING A TRAVEL TIME, MEASURING METHOD

(75) Inventors: Alexey Malinovskiy, Weil Am Rhein (DE); Edgar Schmitt, Friesenheim (DE); Dietmar Spanke, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 235 days.

(21) Appl. No.: 12/448,354

(22) PCT Filed: Dec. 19, 2007

(86) PCT No.: PCT/EP2007/064163
§ 371 (c)(1),
(2), (4) Date: Feb. 25, 2010

(87) PCT Pub. No.: WO2008/080840
PCT Pub. Date: Jul. 10, 2008

(65) Prior Publication Data
US 2010/0162811 A1  Jul. 1, 2010

(30) Foreign Application Priority Data
Dec. 29, 2006 (DE) .......................... 10 2006 062 606

(51) Int. Cl.
*G01N 29/00* (2006.01)
(52) U.S. Cl. ...................................... 73/290 V; 73/620
(58) Field of Classification Search ................ 73/290 V, 73/602, 597, 599, 620; 367/98–99, 908; 702/103
See application file for complete search history.

(56) References Cited

U.S. PATENT DOCUMENTS

| | | | | |
|---|---|---|---|---|
| 4,596,144 A * | 6/1986 | Panton et al. | .................... | 73/620 |
| 4,831,565 A * | 5/1989 | Woodward | ..................... | 702/103 |
| 4,992,998 A * | 2/1991 | Woodward | ....................... | 367/99 |
| 5,079,751 A * | 1/1992 | Woodward | ....................... | 367/96 |
| 5,131,271 A * | 7/1992 | Haynes et al. | ............... | 73/290 V |
| 5,335,545 A * | 8/1994 | Leszczynski | ................... | 73/602 |
| 6,298,008 B1 * | 10/2001 | Lyon et al. | ....................... | 367/99 |
| 6,460,412 B1 * | 10/2002 | Cai et al. | ..................... | 73/290 V |

FOREIGN PATENT DOCUMENTS

| | | |
|---|---|---|
| DE | 103 60 710 A1 | 10/2005 |
| DE | 10 2004 055 555 1 A1 | 5/2006 |
| DE | 10 2004 055 555 A1 | 5/2006 |
| EP | 0 262 990 A2 | 4/1988 |
| WO | WO 2004/010093 | 1/2004 |

* cited by examiner

*Primary Examiner* — Helen C. Kwok
(74) *Attorney, Agent, or Firm* — Bacon & Thomas, PLLC

(57) ABSTRACT

A method for ascertaining and monitoring fill level of a medium in a container a field device using a travel time, measuring method, wherein transmission signals are transmitted and reflection signals received. The received reflection signals are registered as echo signals in an echo function, wherein masking curve, evaluation curves and/or echo parameters of the echo signals in the echo function are ascertained or predetermined, as well as stored in a first measuring cycle. By a static echo search algorithm, through the masking curve, the evaluation curve, the echo parameters, position and/or amplitude of at least one wanted echo signal are/is ascertained, wherein, a dynamic echo search algorithm, a continuous echo tracking of positional changes and/or amplitude changes of individual echo signals and/or the wanted echo signal in the echo function is performed. On the basis of positional changes and/or amplitude changes of individual wanted echo signals, masking curve, evaluation curve and/or echo parameters of the static echo search algorithm are adjusted.

10 Claims, 2 Drawing Sheets

METHOD FOR ASCERTAINING AND MONITORING FILL LEVEL OF A MEDIUM IN A CONTAINER USING A TRAVEL TIME, MEASURING METHOD

TECHNICAL FIELD

The present invention relates to a method for ascertaining and monitoring fill level of a medium in a container using a travel time, measuring method.

BACKGROUND DISCUSSION

Such methods for ascertaining and monitoring fill level in a container are frequently applied in measuring devices of automation and process control technology. Fill level measuring devices of this type are available from Endress+ Hauser, for example, under the marks PROSONIC, LEVELFLEX AND MICROPILOT. These work on the basis of the travel time, measuring method and serve to determine and/or to monitor a fill level of a medium in a container. These fill level measuring devices transmit a periodic transmission signal in the microwave, or ultrasonic, domain by means of a transmitting/receiving element in the direction of the surface of a fill substance and receive the reflected echo signals following a distance dependent, travel time. Usual fill level measuring devices working with microwaves can be divided, basically, into two classes: a first class, in the case of which the microwaves are sent by means of an antenna in the direction of the fill substance, reflected on the surface of the fill substance and then, after a distance dependent, travel time, are received back; and a second class, in the case of which the microwaves are guided along a waveguide in the direction of the fill substance, are reflected on the surface of the fill substance on the basis of the impedance jump existing there, and the reflected waves are then guided back along the waveguide.

From the received echo signals, as a rule, an echo function representing the echo amplitudes as a function of the travel time is formed, wherein each value of this echo function corresponds to the amplitude of an echo reflected at a certain distance from the transmission element.

In this ascertained echo function, a wanted echo is determined, which corresponds to the reflection of the transmission signal on the surface of the fill substance. From the travel time of the wanted echo, one can, in the case of known propagation velocity of the transmission signals, directly ascertain the distance between transmission element and the surface of the fill substance.

In order to simplify the echo curve evaluation, it is not the received, raw signal of the pulse sequence, which is used, but, instead, the so-called envelope curve. The envelope curve is obtained, for example, by rectifying the raw signal of the pulse sequence and then filtering via a lowpass.

There are a number of different methods for detecting the wanted echo in an envelope curve, and these can be divided basically into two groups: either the static ascertainment methods with static echo search algorithms; and/or the dynamic ascertainment methods with dynamic echo search algorithms.

In a first method of the static echo search group, using a static echo search algorithm, that echo is selected as a wanted echo, which has a larger amplitude than the remaining echos. It is, thus, the echo with the largest amplitude in the envelope curve, which is selected as the wanted echo.

In a second method of the static echo search group, it is assumed by a static echo search algorithm, that the wanted echo is the first echo in the envelope curve after the transmission pulse. Thus, the first echo in the envelope curve is selected as the wanted echo.

It is possible to combine the two methods with one another in a static echo search algorithm, by defining e.g. a so-called, first echo factor. The first echo factor is a predetermined factor, by which an echo must exceed a certain amplitude, in order to be recognized as a wanted echo. Alternatively, a travel time dependent echo threshold can be defined, which an echo must exceed, in order to be recognized as the wanted echo.

In a third method, the fill level, measuring device is told, once, the current fill level. The fill level, measuring device can, on the basis of such input fill level, identify the associated echo as the wanted echo and e.g. track it by a suitable, dynamic, echo search algorithm. Such methods are referred to as echo tracking methods. In such case, e.g. in each measuring cycle, maxima of the echo signal or the echo function are ascertained and, on the basis of the knowledge of the fill level ascertained in the preceding measuring cycle and an application-specific, maximum expected rate of change of the fill level, the wanted echo is detected. From the travel time of the so-ascertained, current wanted echo, there results, then, the new fill level.

A fourth method is described in DE 102 60 962 A1. There, the wanted echo is ascertained on the basis of data stored earlier in a memory. In such case, echo functions are derived from received echo signals. The echo functions show the amplitudes of the echo signals as a function of travel time. The echo functions are stored in a table, wherein each column serves for accommodating an echo function. The echo functions are stored in the columns in a sequence, which corresponds to the fill level associated with the respective echo functions. In operation, the wanted echo and the associated fill level are ascertained with the assistance of the table on the basis of the echo function of the current transmission signal.

In DE 103 60 710 A1, a fifth method is described, wherein, periodically, transmission signals are sent in the direction of the fill substance, their echo signals recorded and converted into an echo function, at least one echo characteristic of the echo function is ascertained, and, on the basis of the echo characteristics of at least one preceding measuring, a prediction for the echo characteristics to be expected in the case of the current measuring is derived. The echo characteristics of the current measuring are ascertained, taking into consideration the prediction, and, on the basis of the echo characteristics, the current fill level is ascertained. This method comes closest to being an echo tracking.

In DE 10 2004 052 110 A1, a sixth method is described for improving wanted echo detection through echo evaluation and classification of the echos in the envelope curve.

The above described methods work per se in a plurality of applications without problem. Problems occur, however, always when the echo stemming from the fill level on the basis of the method cannot be identified without there being some doubt as to the correctness of the identification.

In the case of the first method, there occurs, for example, measurement problems, when installed objects are present in the container, which reflect the transmission signals better than the surface of the fill substance.

In the case of echo tracking according to the third method, measurement problems occur, when, during operation, the wanted echo runs together with a disturbance echo and, subsequently, the disturbance echo is tracked as an incorrect wanted echo. Furthermore, a problem occurs, when, upon turn-on, the preceding wanted echo signal no longer fits the actual situation, or the preceding wanted echo signal is not known.

If, mistakenly, another echo than the fill level echo is classified as a wanted echo, there is the danger that a wrong fill level is output, without such being noticed. This can, depending on application, lead to an overfilling of containers, to operation of pumps empty or to other events connected, on occasion, with considerable danger.

SUMMARY OF THE INVENTION

An object of the invention is to provide an improved, adapted and self-learning method for evaluation of wanted echo signals in echo curves in the travel time measurement of measuring signals.

This object of the invention is achieved by transmitting transmission signals in the direction of the medium and receiving reflection signals; registering the received reflection signals as echo signals in an echo function as a function of travel time or travel distance; ascertaining or predetermining as well as storing in a first measuring cycle, a masking curve, evaluation curves and/or echo parameters of the echo signals in the echo function; ascertaining at least one wanted echo signal in the echo function by means of a static echo search algorithm, through the masking curve, evaluation curve, the echo parameters, position ($x_1$) and/or amplitude ($A_1$); performing a continuous echo tracking of positional changes and/or of amplitude changes of individual echo signals and/or the wanted echo signal in the echo function by means of a dynamic echo search algorithm; and adjusting the masking curve, the evaluation curve and/or the echo parameters of the static echo search algorithm are adjusted on the basis of positional changes and/or amplitude changes of individual wanted echo signals from the echo tracking by the dynamic echo search algorithm.

Advantageous further developments of the invention are set forth in the dependent claims.

BRIEF DESCRIPTION OF THE DRAWINGS

Other details, features and advantages of the subject matter of the invention will become evident from the subsequent description with the associated drawings, in which preferred examples of embodiments of the invention are presented. In the examples of embodiments of the invention shown in the figures, in order to avoid clutter and for simplification, elements, corresponding in construction and/or function, are provided with equal reference characters. The figures of the drawing show as follows.

DETAILED DISCUSSION IN CONJUNCTION WITH THE DRAWINGS

Figure 1:
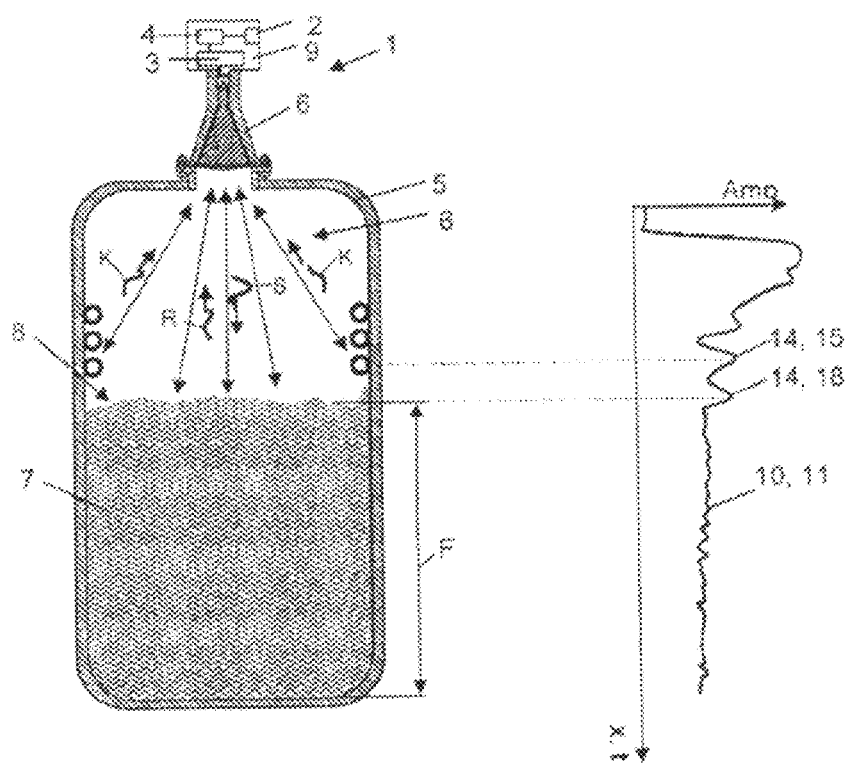
FIG. 1 an example of an embodiment of a measuring device for ascertaining fill level, together with a corresponding echo function.

FIG. 1 shows a measuring device 1 working according to the travel time measuring method and mounted on a container 5 at a nozzle thereof for ascertaining the fill level F of a medium 7. The illustrated measuring device 1 includes: a transmitting/receiving element 6 radiating freely into the process space; and a measurement transmitter 9. The measurement transmitter 9 includes: at least one transmitting/receiving unit 3, which serves for producing and receiving the measuring signals; a control/evaluation unit 4, which serves for signal processing of the measuring signals and for controlling the measuring device 1; and a communication unit 2, which controls communication via a bus system as well as the energy supply of the measuring device 1. Integrated in the control/evaluation unit 4 is, for example, a memory element, in which measurement parameters and echo parameters are stored and in which measuring factors and echo factors are stored. The transmitting/receiving element 6 is constructed in this example of an embodiment, for example, as a horn antenna; however, the transmitting/receiving element 6 can have any known antenna form, such as e.g. a rod-shaped antenna or a planar antenna. In the transmitting/receiving unit 3, a measuring signal, for example, in the form of a high-frequency, transmission signal S, is produced and radiated via the transmitting/receiving element 6 with a predetermined radiation characteristic in the direction of medium 7. Following a travel time t dependent on the traveled distance x, the transmission signals S reflected on the surface 8 of the medium 7 are received back by the transmitting/receiving element 6 and the transmitting/receiving unit 3 as reflection signal R. The subsequently connected, control/evaluation unit 4 ascertains from the reflection signals R an echo function 10, which presents the amplitudes of the echo signals 14 of the reflection signals R as a function of the traveled distance x or the corresponding travel time t. Via an analog/digital conversion of the analog echo function 10, or the echo curve 10, a digitized, envelope curve 11 is produced. In the following, only the echo function 10 will be referred to, with the understanding that this terminology likewise implies the echo curve 10, the envelope function, or the envelope curve 11.

An echo function 10 reflecting the measuring situation in the container 5 is shown as a function of the traveled distance x of the transmission signal S. For better understanding, reference lines are associated with the corresponding echo signals 18 in the echo function 10, so that cause and effect can be seen. In the beginning region of the echo function 10, the decay behavior, or so-called ringing, is evident, such as can occur on the basis of multiple reflections or also through accretion formation in the transmitting/receiving element 6 or in the nozzle. The method of the invention is not only applicable for freely radiating, microwave, measuring devices 1, such as is presented in FIG. 1, but is, as well, applicable in other travel time measurement systems, such as, for example, TDR, measuring devices or ultrasonic, measuring devices.

According to the current state of the art, there are different approaches for detecting the exact position $x_1$ of the wanted echo signal 15 in the ascertained echo function 10 or digital envelope curve. The accuracy of measurement that can be achieved with this echo measuring principle under the given measuring conditions depends on the exact ascertaining of the measured position of the fill level F in the echo function 10.

Figure 2:
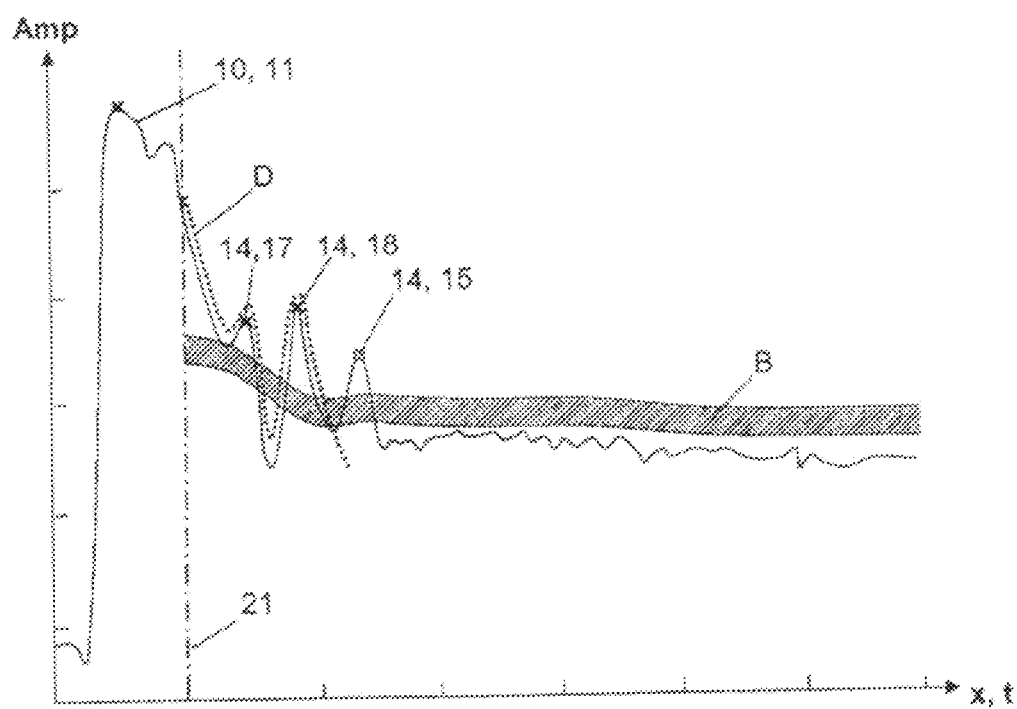
FIG. 2 an echo function with evaluation function determined by a static echo search algorithm.

A static approach for ascertaining fill level is shown in the echo function 10 in FIG. 2. FIG. 2 shows the echo function of FIG. 1 enlarged and rotated into the horizontal. Measured on the abscissa axis is the required travel time t or the traveled path x of the measuring signal in the container 5, and the ordinate axis contains the amplitude values Amp of the echo function 10.

In the diagram, an evaluation curve B is presented, which is ascertained by means of a static echo search algorithm, e.g. a mathematical filter function in the form of a sliding average formation, from the given echo function 10 or from an echo function 10 ascertained at start-up in the empty container 5. This evaluation curve B is used for ascertaining the wanted echo signals 15 in the echo function 10. Thus, this evaluation curve B is used as reference line, or departure criterion, for the static echo search algorithm 12 of wanted echo signals 15 in the echo function 10. As a result, it is possible to identify the wanted echo signals 15 in the echo function 10 by means of the evaluation curve B. The signal components, which lie above the evaluation curve B, are detected by the static echo search algorithm 12 as wanted echo signals 15.

Moreover, a masking curve D is shown, on the basis of which, disturbance signals R and noise signals N, which, for example, which can arise from disturbance reflections on installed objects in the container, from multipath propagation and from multimode propagation, from foam, and accretion, formation by the medium, and from turbulent medium surfaces, are masked out.

For setting the measuring conditions and the evaluation condition by means of the static and dynamic echo search algorithms 12,13, depending on measuring device 1 and application, a number of different parameters are required. Included among the parameters are also data concerning the geometry of the used container 5, an empty distance, in the case of which the fill level, measuring device 1 should detect, that a container is empty of the medium 7, and a fill level upper limit, in the case of which the fill level, measuring device 1 should detect, that the container 5 is full. Besides these parameters, also included are, as a rule, also: An application dependent, measuring device specific, block distance, within which no fill level measurement is possible; a background signal, which is to be masked out in the measuring; as well as material properties of the medium 7, such as e.g. its dielectric constant.

Also selection rules play an important role for determining the wanted echo signal 15. These static selection rules are referred to in the industry frequently as first echo factor. Such static selection rules can, depending on application, specify, that that echo with the shortest travel time is to be selected as wanted echo, that that echo with the largest amplitude is to be selected as wanted echo, or that the wanted echo is to be selected on the basis of a weighting function, which takes into consideration the travel times and the amplitudes of the echo signals.

Figure 3:
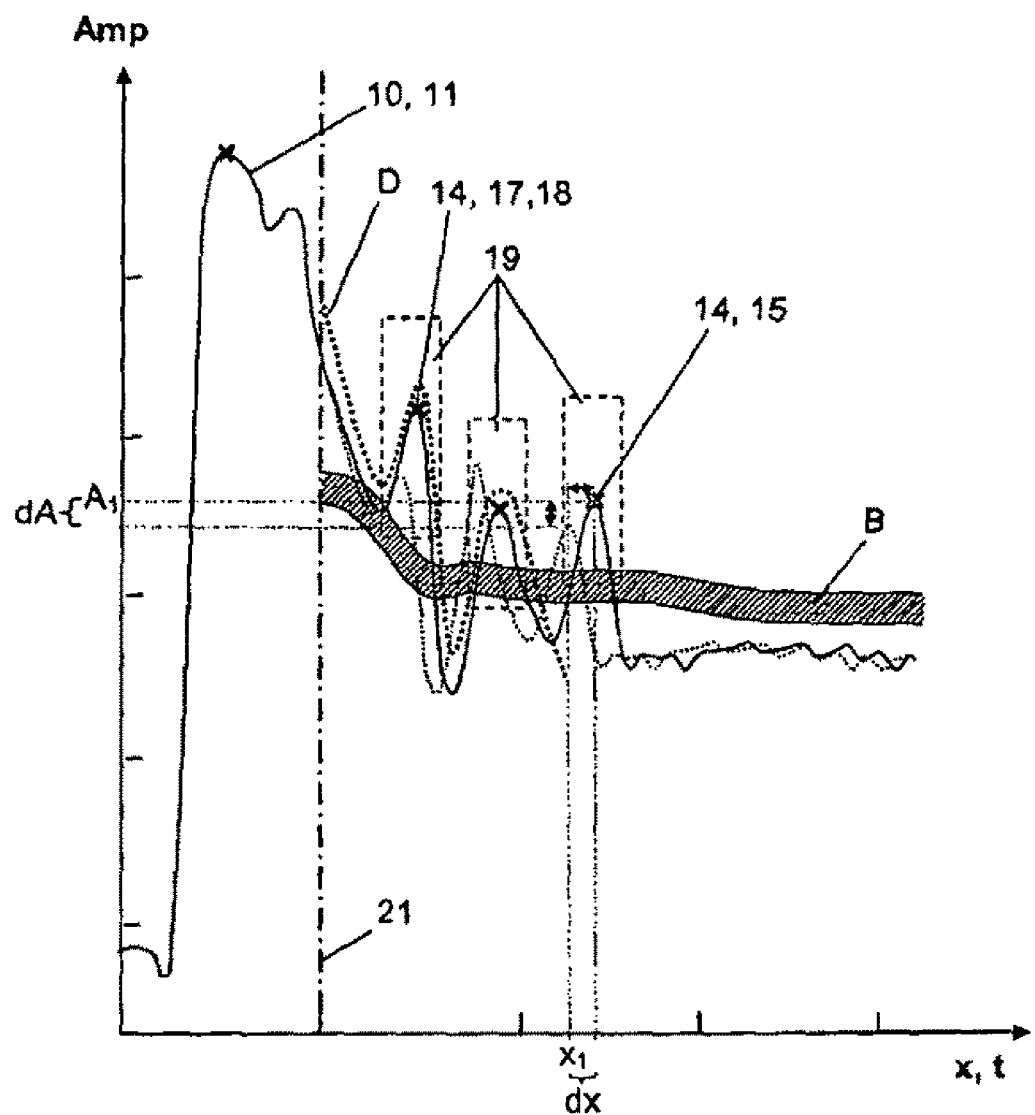
FIG. 3 an echo function with echo tracking determined by a dynamic echo search algorithm.

In order to adjust these static selection rules to changing measuring conditions, in FIG. 3, a slightly enlarged drawing of the echo function of FIG. 2 is presented, along with a combination of the invention of the static echo search algorithm 12 and the dynamic echo search algorithm 13. Due to changing measuring conditions or changes in the measuring device 1, the ascertained echo function 10 changes. The current echo function 10 is shown by a continuous line and the old echo function 10 as a dotted line. Through direct comparison, positional changes dx of the position $x_1$ and amplitude changes dA of the amplitude $A_1$ in the echo signals and the wanted echo signal 15 can be ascertained. According to the invention, an echo tracking of the echo signals 14 and the wanted echo signal 15 is performed by means of a dynamic echo tracking algorithm 13. For this, either the position $x_1$ of the wanted echo signal 15 is ascertained before a first measuring cycle by means of a static echo search algorithm 12 or the position $x_1$ of the wanted echo signal 15 is selected by the operator of the measuring device 1 from the illustrated echo function 10, or envelope curve 11, or input as corresponding parameter. At this position $x_1$, a search window 19 is placed by the dynamic echo search algorithm 13. This search window 19 has a predetermined width and height and is so arranged, that, starting from the position $x_1$ and extending to a positional change dx in the two opposing directions, the echo signal 14 or the wanted echo signal 15 can be searched for. Used as position $x_1$ is the peak or a defined point in the region of the echo signal 14 or the wanted echo signal 15. The width and height of the search window can also, for example, be matched to the height and pulse width of the echo signal 14 and the wanted echo signal 15.

From the positional change dx and the amplitude change dA, deductions can be made concerning changes in the masking curve D, the evaluation curve B and the echo parameters E. The evaluation curve B and the masking curve D are newly calculated or adjusted on the basis of the new positional data of the echo signals 14 and the wanted echo signals 15. Through this method of the invention, the static echo search algorithm 12 is, on the basis of the changes in the ascertainment parameters, such as e.g. the masking curve D, the evaluation curve B and the echo parameters E, adjusted to the changing measuring conditions. The change histories of the masking curve D, the evaluation curve B and the echo parameters E are stored in a so-called drag pointer 20, which retains the minimum and maximum states. Referenced to the earlier described, first echo factor, the region between the minimum state and the maximum state of the first echo factor in the drag pointer 20 shows the range, in which an ascertaining of the wanted echo signal 15 is possible.

The invention claimed is:

1. A method for ascertaining and monitoring the fill level of a medium in a container by means of a field device using a travel time, the method comprising the steps of:

transmitting transmission signals in a direction of the medium and receiving reflection signals;

registering the received reflection signals as echo signals in an echo function as a function of travel time or travel distance;

ascertaining or predetermining as well as storing in a first measuring cycle, a masking curve, evaluation curves and/or echo parameters of the echo signals in the echo function;

ascertaining at least one wanted echo signal in the echo function by means of a static echo search algorithm, through the masking curve, the evaluation curves, the echo parameters, position ($x_1$) and/or amplitude ($A_1$);

performing a continuous echo tracking of positional changes and/or of amplitude changes of individual echo signals and/or the wanted echo signal in the echo function by means of a dynamic echo search algorithm;

adjusting the masking curve, the evaluation curves and/or the echo parameters of the static echo search algorithm are adjusted on the basis of positional changes and/or amplitude changes of individual wanted echo signals from the echo tracking by the dynamic echo search algorithm;

making from the positional changes and the amplitude changes deductions concerning changes in the masking curve, the evaluation curves and the echo parameters;

newly calculating or adjusting on the basis of the new positional changes of the echo signals and the wanted echo signal the evaluation curves and the masking curve; and adjusting the static echo search algorithm on the basis of the changes in the masking curve, the evaluation curves and the echo parameters to the changing measuring conditions.

2. The method as claimed in claim 1, wherein:
the position ($x_1$) and/or the amplitude ($A_1$) of the wanted echo signal in the echo function are/is predetermined by an operator in the first measuring cycle.

3. The method as claimed in claim 1, wherein:
on the basis of the dynamic echo search algorithm, starting from the position ($x_1$) and/or the amplitude ($A_1$) of the wanted echo signal, the echo tracking of the wanted echo signal is performed in a defined search window.

4. The method as claimed in claim 3, wherein:
a width and/or a height of the search window are/is predetermined.

5. The method as claimed in claim 3, wherein:
in the static echo search algorithm, a first occurring, wanted echo signal or a maximum echo signal with a maximum amplitude value in the echo function is ascertained as the wanted echo signal.

6. The method as claimed in claim 3, wherein:
an envelope curve is formed by means of smoothing and filtering of the echo function.

7. The method as claimed in claim 3, wherein:
a classification of echo type is performed by means of the dynamic echo search algorithm.

8. The method as claimed in claim 7, wherein:
histories of the masking curve, the evaluation curves, each echo type classification and/or echo parameters are stored in at least one drag pointer as at least one maximum state and/or minimum state.

9. The method as claimed in claim 6, wherein:
full, echo position, empty, echo position and/or statistics of the envelope curve are stored as echo parameters of a first echo factor.

10. The method as claimed in claim 1, wherein:
the static echo search algorithm is executed at start-up and at restart of the field device, before the dynamic echo search algorithm.

* * * * *